(12) United States Patent
Yoshizawa et al.

(10) Patent No.: US 12,439,016 B2
(45) Date of Patent: Oct. 7, 2025

(54) DISPLAY CONTROL DEVICE, DISPLAY CONTROL METHOD, AND NON-TRANSITORY COMPUTER READABLE MEDIUM FOR DISPLAYING CAPTURED IMAGE INCLUDING TWO IMAGE REGIONS

(71) Applicant: CANON KABUSHIKI KAISHA, Tokyo (JP)

(72) Inventors: Genya Yoshizawa, Kanagawa (JP); Akio Yoshikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 266 days.

(21) Appl. No.: 18/329,710

(22) Filed: Jun. 6, 2023

(65) Prior Publication Data
US 2023/0412931 A1     Dec. 21, 2023

(30) Foreign Application Priority Data
Jun. 17, 2022   (JP) ................................. 2022-098053

(51) Int. Cl.
*H04N 13/218*   (2018.01)
*G06T 7/11*   (2017.01)
*H04N 13/207*   (2018.01)
*H04N 23/63*   (2023.01)
*H04N 23/698*   (2023.01)
*H04N 23/84*   (2023.01)

(52) U.S. Cl.
CPC ............ *H04N 13/218* (2018.05); *G06T 7/11* (2017.01); *H04N 23/63* (2023.01); *H04N 23/84* (2023.01); *H04N 13/207* (2018.05); *H04N 23/698* (2023.01)

(58) Field of Classification Search
CPC ...... H04N 13/218; H04N 23/63; H04N 23/84; H04N 13/161; G06T 7/11; G06T 7/12
See application file for complete search history.

(56) References Cited

U.S. PATENT DOCUMENTS

2019/0379877 A1*  12/2019  Oh ...................... H04N 13/139

FOREIGN PATENT DOCUMENTS

JP        2020-109914 A    7/2020
JP        2022-046260 A    3/2022

* cited by examiner

*Primary Examiner* — Nicholas G Giles
(74) *Attorney, Agent, or Firm* — Cowan, Liebowitz & Latman, P.C.

(57) ABSTRACT

A display control device according to the present invention includes: a processor; and a memory storing a program which, when executed by the processor, causes the display control device to acquire a captured image including a first image region and a second image region, wherein the first image region is inside an image circle and the second image region is outside the image circle, perform predetermined image processing on the captured image, and perform control so that an image after the predetermined image processing is displayed in a state where the predetermined image processing is performed on the first image region and is not performed on the second image region so as to be distinguishable a boundary between the first image region and the second image region.

17 Claims, 7 Drawing Sheets

| COLOR | MEANING |
|---|---|
| RED | WHITE REGION (INCLUDING WHITE-SATURATION REGION) HAVING GRADATION VALUE OF 255 |
| YELLOW | GRAY REGION HAVING GRADATION VALUE OF AT LEAST 193 AND NOT MORE THAN 254 |
| PEACH | GRAY REGION HAVING GRADATION VALUE OF AT LEAST 129 AND NOT MORE THAN 192 |
| GREEN | GRAY REGION HAVING GRADATION VALUE OF AT LEAST 65 AND NOT MORE THAN 128 |
| BLUE | GRAY REGION HAVING GRADATION VALUE OF AT LEAST 1 AND NOT MORE THAN 64 |
| PURPLE | BLACK REGION (INCLUDING BLACK-SATURATION REGION) HAVING GRADATION VALUE OF 0 |

DISPLAY CONTROL DEVICE, DISPLAY CONTROL METHOD, AND NON-TRANSITORY COMPUTER READABLE MEDIUM FOR DISPLAYING CAPTURED IMAGE INCLUDING TWO IMAGE REGIONS

BACKGROUND OF THE INVENTION

Field of the Invention

The present invention relates to a display control device, a display control method, and a non-transitory computer readable medium.

Description of the Related Art

Digital cameras having two optical systems have been known. Such digital cameras are capable of capturing, for example, an image in which two image regions having parallax are arranged on right and left sides (Japanese Patent Application Laid-open No. 2022-046260). In this image, a non-image region (ineffective region) exists around two image regions (effective regions).

Further, color conversion processing (false-color processing) to convert the colors of respective pixels of an input image into colors corresponding to the brightness levels of the pixels has been known (Japanese Patent Application Laid-open No. 2020-109914). For example, the false-color processing converts black (having a brightness level of 0% and including black saturation) into blue and facilitates the confirmation of an exposed state.

However, conventional technologies may not display an image after a predetermined image processing (for example, false-color processing) to a captured image including an image region and a non-image region in a suitable state in some cases.

SUMMARY OF THE INVENTION

The present invention provides a technique capable of displaying an image based on a captured image including image regions and a non-image region in a suitable state.

A display control device according to the present invention includes: a processor; and a memory storing a program which, when executed by the processor, causes the display control device to acquire a captured image including a first image region and a second image region, wherein the first image region is inside an image circle and the second image region is outside the image circle, perform predetermined image processing on the captured image, and perform control so that an image after the predetermined image processing is displayed in a state where the predetermined image processing is performed on the first image region and is not performed on the second image region, so as to be distinguishable a boundary between the first image region and the second image region.

Further features of the present invention will become apparent from the following description of exemplary embodiments with reference to the attached drawings.

DESCRIPTION OF THE EMBODIMENTS

Hereinafter, embodiments of the present invention will be described with reference to the drawings. The present embodiment will describe a case in which electronic equipment is a digital camera (imaging device) as an example. The digital camera according to the present embodiment is capable of acquiring one image (two-lens image) including a left-image region and a right-image region having predetermined parallax in a right-and-left direction and displaying the acquired image on a display unit.

Figure 1A:
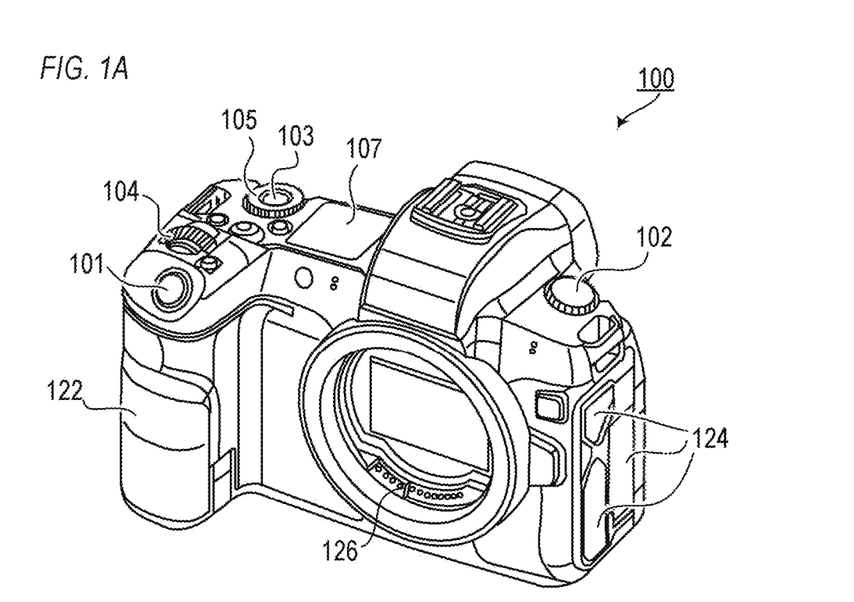
FIGS. 1A and 1B are external views of a camera.
Figure 1B:
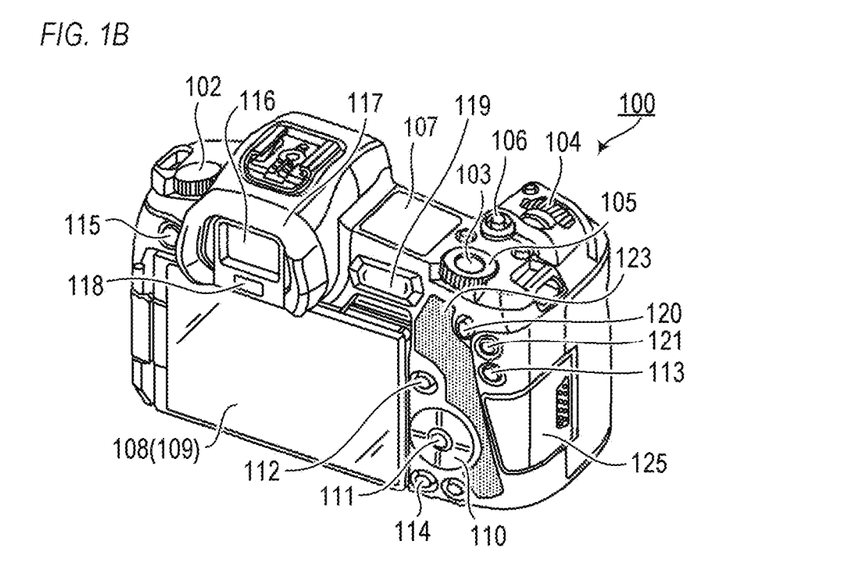

FIGS. 1A and 1B are external views showing an example of the appearance of a digital camera (camera) 100 according to the present embodiment. FIG. 1A is a perspective view of the camera 100 when viewed from its front-surface side, and FIG. 1B is a perspective view of the camera 100 when viewed from its back-surface side.

The camera 100 has a shutter button 101, a power switch 102, a mode selection switch 103, a main electronic dial 104, a sub-electronic dial 105, a moving-image button 106, and a display unit 107 outside a finder on its top surface. The shutter button 101 is an operation member used to provide photographing preparation instructions or photographing instructions. The power switch 102 is an operation member used to switch between the ON and OFF states of the power of the camera 100. The mode selection switch 103 is an operation member used to select various modes. The main electronic dial 104 is a rotary operation member used to change a setting value of a shutter speed, an aperture, or the like. The sub-electronic dial 105 is a rotary operation member used to perform the movement of a selected frame (cursor), image feeding, or the like. The moving-image button 106 is an operation member used to provide instructions to start or stop photographing (recording) moving images. The display unit 107 outside the finder displays various setting values of a shutter speed, an aperture, or the like.

The camera 100 has a display unit 108, a touch panel 109, a direction key 110, a SET button 111, an AE lock button 112, an enlargement button 113, a reproduction button 114, a menu button 115, an eyepiece unit 116, an eyepiece detection unit 118, a touch bar 119, a multi-controller 120, and a display-mode selection button 121 on its back surface. The display unit 108 displays an image or various information. The touch panel 109 is an operation member used to detect a touch operation on the display surface (touch operation surface) of the display unit 108. The direction key 110 is an operation member composed of keys (four direction keys) capable of being pressed in both a top-and-bottom direction and a right-and-left direction. It is possible to perform processing corresponding to a position at which the direction key 110 is pressed. The SET button 111 is an operation member pressed mainly when a selected item is determined. The AE lock button 112 is an operation member pressed when an exposed state is fixed in a photographing standby state. The enlargement button 113 is an operation member used to switch between the ON and OFF states of an enlargement mode in the live-view display (LV display) of a photographing mode. When the enlargement mode is ON, a live-view image (LV image) is enlarged or contracted by the operation of the main electronic dial 104. Further, the enlargement button 113 is used to enlarge a reproduction image or increase a magnification ratio in a reproduction mode. The reproduction button 114 is an operation member used to switch between a photographing mode and a reproduction mode. The photographing mode is switched to the reproduction mode when the reproduction button 114 is pressed, and the latest image among images recorded on a recording medium 227 that will be described later may be displayed on the display unit 108.

The menu button 115 is an operation member pressed to display a menu screen enabling various settings on the display unit 108. A user may intuitively perform various settings using the menu screen displayed on the display unit 108 and the direction key 110 or the SET button 111. The eyepiece unit 116 is a portion at which an eye of the user is in contact with and looks into an eyepiece finder (looking-into type finder) 117. Through the eyepiece unit 116, the user may visually recognize video displayed on an EVF 217 (Electronic View Finder) inside the camera 100 that will be described later. The eyepiece detection unit 118 is a sensor used to detect whether an eye of the user is in contact with the eyepiece unit 116 (the eyepiece finder 117).

The touch bar 119 is a linear touch-operation member (line touch sensor) capable of receiving a touch operation. The touch bar 119 is arranged at a position (touchable position) at which the user is capable of performing a touch operation with the thumb of a right hand while holding a grip unit 122 with the right hand (i.e., holding the grip unit 122 with the little finger, the ring finger, and the middle finger of the right hand) so as to enable the pressing of the shutter button 101 with the index finger of the right hand. That is, the touch bar 119 is operable in a state (photographing state) in which the user holds the camera 100 up so that an eye of the user is in contact with the eyepiece finder 117 and looks into the eyepiece unit 116 to enable the pressing of the shutter button 101 at all times. The touch bar 119 is capable of receiving a tap operation (the operation of releasing the thumb of the right hand without moving from a touched position for a predetermined period of time after touching) thereon, a slide operation (the operation of moving a touched position while holding a touched state after touching) in a right-and-left direction, or the like. The touch bar 119 is an operation member different from the touch panel 109 and does not include a display function. The touch bar 119 functions as, for example, a multi-function bar (M-Fn bar) to which various functions are allocatable.

The multi-controller 120 is configured to be capable of being pushed down in all directions. The user may indicate eight directions such as a vertical direction and a horizontal direction by pushing down the multi-controller 120. Further, the user may indicate the exercise of a function allocated to the multi-controller 120 by pressing in the multi-controller 120. The display-mode selection button 121 is an operation member used to select a display mode of an image (including a live-view image), photographing information, or the like to be displayed on the display unit 108 or the EVF 217. A display mode is switched every time the display-mode selection button 121 is pressed, and the user is enabled to visually recognize an image or information in a desired display mode.

Further, the camera 100 has a grip unit 122, a thumb-rest unit 123, a terminal cover 124, a lid 125, a communication terminal 126, or the like. The grip unit 122 is a holding unit formed into a shape easily gripped by the right hand when the user holds the camera 100 up. The shutter button 101 and the main electronic dial 104 are arranged at positions at which the user is capable of performing an operation with the index finger of the right hand while holding the camera 100 with the grip unit 122 gripped with the little finger, the ring finger, and the middle finger of the right hand. Further, in the same state, the sub-electronic dial 105 and the touch bar 119 are arranged at positions at which the user is capable of performing an operation with the thumb of the right hand. The thumb-rest unit 123 (thumb standby position) is a grip unit provided at a place at which the user is enabled to easily put the thumb of the right hand gripping the grip unit 122 in a state in which he/she does not operate the operation members on the back-surface side of the camera 100 at all. The thumb-rest unit 123 is composed of a rubber member or the like for increasing a holding force (grip feeling). The terminal cover 124 protects a connector such as a connection cable that connects the camera 100 to external equipment (external device). The lid 125 closes a slot for storing the recording medium 227 that will be described later to protect the recording medium 227 and the slot. The communication terminal 126 is a terminal used to perform communication with the side of a lens unit (a lens unit 200 or a lens unit 300 that will be described later) attachable to and detachable from the camera 100.

Figure 2:
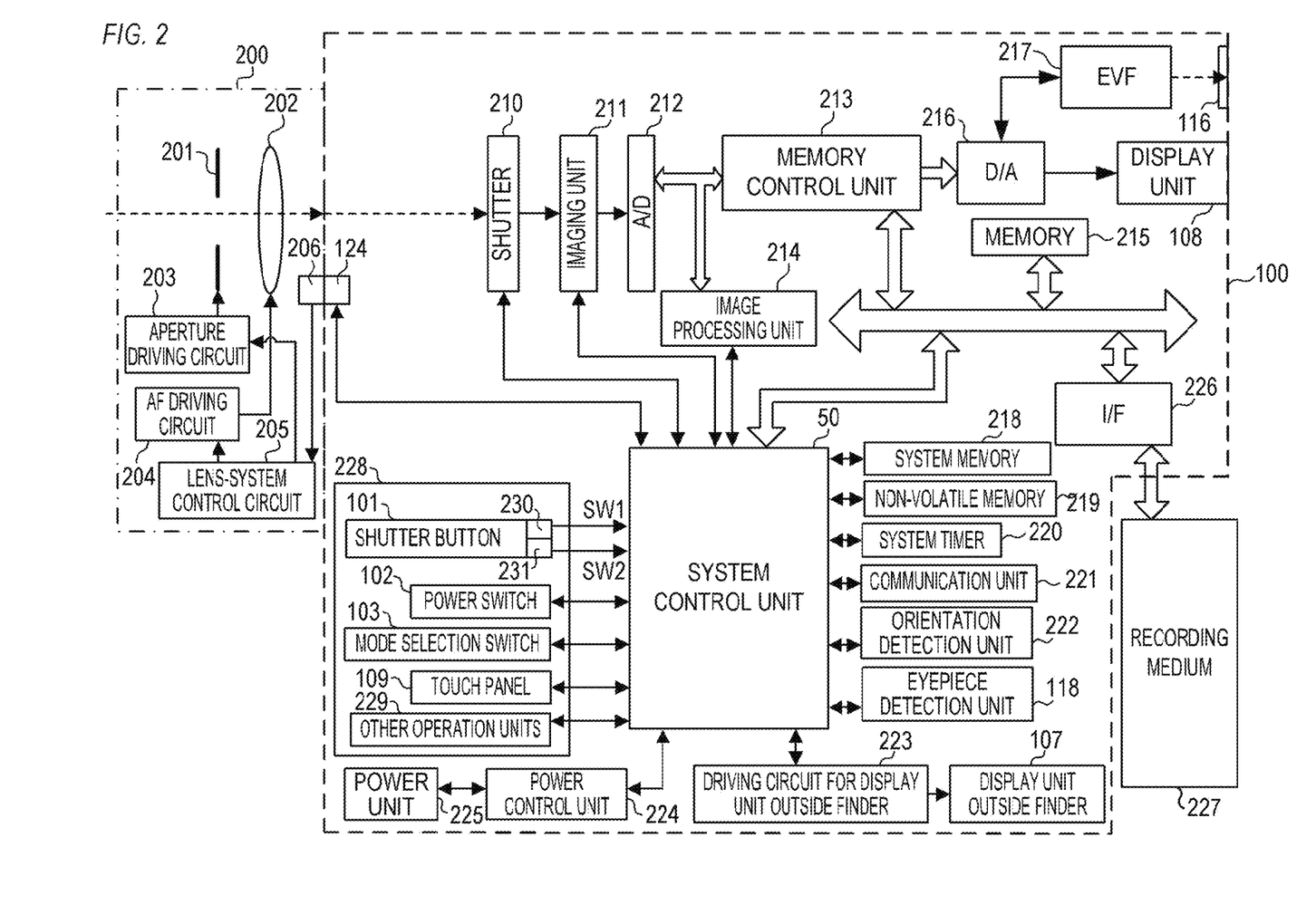
FIG. 2 is a block diagram showing the configuration of the camera.

FIG. 2 is a block diagram showing an example of the configuration of the camera 100. Note that the same constituting elements as those of FIGS. 1A and 1B are denoted by the same symbols, and their descriptions will be appropriately omitted. In FIG. 2, the lens unit 200 is attached to the camera 100.

First, the lens unit 200 will be described. The lens unit 200 is a type of a replaceable lens unit attachable to and detachable from the camera 100. The lens unit 200 is a single-lens unit (monocular lens unit) and shows an example of a normal lens unit. The lens unit 200 has an aperture 201, a lens 202, an aperture driving circuit 203, an AF (Auto Focus) driving circuit 204, a lens-system control circuit 205, a communication terminal 206, or the like.

The aperture 201 is configured to be capable of adjusting an aperture diameter. The lens 202 is composed of a plurality of lenses. The aperture driving circuit 203 adjusts a light amount by controlling the aperture diameter of the aperture 201. The AF driving circuit 204 drives the lens 202 to obtain focus. The lens-system control circuit 205 controls the aperture driving circuit 203, the AF driving circuit 204, or the like on the basis of instructions from a system control unit 50 that will be described later. The lens-system control circuit 205 controls the aperture 201 via the aperture driving circuit 203. Further, the lens-system control circuit 205 obtains focus by changing the position of the lens 202 via the AF driving circuit 204. The lens-system control circuit 205 is capable of performing communication with the camera 100. Specifically, communication is performed via the communication terminal 206 of the lens unit 200 and the communication terminal 126 of the camera 100. The communication terminal 206 is a terminal used when the lens unit 200 performs communication with the side of the camera 100.

Next, the camera 100 will be described. The camera 100 has a shutter 210, an imaging unit 211, an A/D convertor 212, a memory control unit 213, an image processing unit 214, a memory 215, a D/A convertor 216, an EVF 217, a display unit 108, and a system control unit 50.

The shutter 210 is a focal-plane shutter capable of freely controlling an exposure time of the imaging unit 211 on the basis of instructions from the system control unit 50. The imaging unit 211 is an imaging element (image sensor) composed of a CCD element, a CMOS element, or the like that converts an optical image into an electric signal. The imaging unit 211 may have an imaging-surface phase-difference sensor that outputs defocus-amount information to the system control unit 50. The A/D convertor 212 converts an analog signal output from the imaging unit 211 into a digital signal. The image processing unit 214 performs predetermined image processing (resize processing such as pixel interpolation and contraction, color conversion processing, or the like) on data from the A/D convertor 212 or data from the memory control unit 213. Further, the image processing unit 214 performs predetermined computation processing using data on a captured image, and the system control unit 50 performs exposure control or ranging control on the basis of an obtained computation result. By this processing, AF processing of a TTL (Through-The-Lens) system, AE (Automatic Exposure) processing, EF (Electronic Flash Pre-Emission) processing, or the like is performed. Moreover, the image processing unit 214 performs predetermined computation processing using data on a captured image, and the system control unit 50 performs AWB (Automatic White Balance) processing of a TTL system on the basis of an obtained computation result.

Image data from the A/D convertor 212 is written into the memory 215 via the image processing unit 214 and the memory control unit 213. Alternatively, image data from the A/D convertor 212 is written into the memory 215 via the memory control unit 213 without going through the image processing unit 214. The memory 215 stores image data that has been obtained by the imaging unit 211 and converted into digital data by the A/D convertor 212 or image data that is to be displayed on the display unit 108 or the EVF 217. The memory 215 includes storage capacity enough to store a predetermined number of still images or moving images and sounds for a predetermined period of time. Further, the memory 215 serves also as a memory (video memory) for displaying images.

The D/A convertor 216 converts image data for display stored in the memory 215 into an analog signal and supplies the converted signal to the display unit 108 or the EVF 217. Accordingly, image data for display written into the memory 215 is displayed on the display unit 108 or the EVF 217 via the D/A convertor 216. The display unit 108 or the EVF 217 performs display according to an analog signal from the D/A convertor 216. The display unit 108 or the EVF 217 is, for example, a display such as an LCD and an organic EL display. When a digital signal that has been A/D-converted by the A/D convertor 212 and accumulated in the memory 215 is converted into an analog signal by the D/A convertor 216 and sequentially transferred to and displayed on the display unit 108 or the EVF 217, live-view display is performed.

The system control unit 50 is a control unit including at least one processor and/or at least one circuit. That is, the system control unit 50 may be a processor, a circuit, or a combination of a processor and a circuit. The system control unit 50 controls the whole camera 100. The system control unit 50 realizes the respective processing of flowcharts that will be described later by running a program recorded on a non-volatile memory 219. Further, the system control unit 50 performs also display control by controlling the memory 215, the D/A convertor 216, the display unit 108, the EVF 217, or the like. The system control unit 50 is capable of identifying the type of a lens unit attached to the camera 100 by performing communication via the communication terminal 126 and the communication terminal 206.

Further, the camera 100 has a system memory 218, a non-volatile memory 219, a system timer 220, a communication unit 221, an orientation detection unit 222, and an eyepiece detection unit 118.

As the system memory 218, a RAM is, for example, used. Into the system memory 218, a constant for operating the system control unit 50, a variable, a program read from the non-volatile memory 219, or the like is developed. The non-volatile memory 219 is electrically-erasable/recordable memory, and an EEPROM is, for example, used as the non-volatile memory 219. On the non-volatile memory 219, a constant for operating the system control unit 50, a program, or the like is recorded. Here, the program refers to a program for running the flowcharts that will be described later. The system timer 220 is a clocking unit that measures time used in various control or time of an embedded clock. The communication unit 221 performs the transmission and reception of a video signal or a sound signal with external equipment connected via a wireless or wired cable. The communication unit 221 is connectable also to a wireless LAN (Local Area Network) or the Internet. Further, the communication unit 221 is communicable with external equipment through Bluetooth™ or Bluetooth Low Energy. The communication unit 221 is capable of transmitting an image (including a live-view image) that has been captured by the imaging unit 211 or an image that has been recorded on the recording medium 227, and capable of receiving an image or various other information from external equipment. The orientation detection unit 222 detects the orientation (inclination) of the camera 100 with respect to a gravity direction. On the basis of an orientation detected by the orientation detection unit 222, an inclination angle in the horizontal (a right-and-left direction) or the vertical direction (the top-and-bottom direction; the front-and-back direction) of the camera 100 is detectable. Further, on the basis of an orientation detected by the orientation detection unit 222, it is possible to discriminate whether an image that has been captured by the imaging unit 211 is an image that has been captured when the camera 100 is held in horizontal orientation or an image that has been captured when the camera 100 is held in vertical orientation. The system control unit 50 is capable of adding direction information corresponding to an orientation that has been detected by the orientation detection unit 222 to an image file of an image that has been captured by the imaging unit 211, or capable of rotating an image according to a detected orientation. It is also possible to detect the movement (pan, tilt, lifting, standing-still, or the like) of the camera 100 using the orientation detection unit 222. As the orientation detection unit 222, an acceleration sensor, a gyro sensor, or the like is, for example, usable.

The eyepiece detection unit 118 is capable of detecting the approach of any object toward the eyepiece unit 116 (the eyepiece finder 117). As the eyepiece detection unit 118, an infrared proximity sensor is, for example, usable. When an object approaches the eyepiece unit 116, infrared light projected from the projection unit of the eyepiece detection unit 118 is reflected at the object and received by the light-receiving unit of the infrared proximity sensor. On the basis of the amount of the received infrared light, a distance from the eyepiece unit 116 to the object is discriminable. As described above, the eyepiece detection unit 118 performs eyepiece detection to detect the proximity distance of an object with respect to the eyepiece unit 116. The eyepiece detection unit 118 is an eyepiece detection sensor that detects the approach (contact) and regression (separation) of an eye (object) with respect to the eyepiece unit 116. When an object approaching the eyepiece unit 116 within a predetermined distance is detected from a non-contacting state (non-approaching state), the eyepiece detection unit 118 detects the contact of the object. On the other hand, when the object having approached the eyepiece unit 116 is separated by at least a predetermined distance from a contacting state (approaching state), the eyepiece detection unit 118 detects the separation of the object. A threshold for detecting contact and a threshold for detecting separation may be different from each other by, for example, setting hysteresis or the like. Further, after the detection of contact, it is assumed that a contacting state is maintained until separation is detected. After the detection of the separation, it is assumed that a non-contacting state is maintained until contact is detected. The system control unit 50 switches between the display (display state) and non-display (non-display state) of the display unit 108 and the EVF 217 according to a state detected by the eyepiece detection unit 118. Specifically, when the camera 100 is in at least a photographing standby state and when the switching of a display destination is set to automatic switching, the display unit 108 is turned ON as a display destination and the EVF 217 is hidden in a non-contacting state. Further, the EVF 217 is turned ON as a display destination and the display unit 108 is hidden in a contacting state. Note that the eyepiece detection unit 118 is not limited to an infrared proximity sensor, but any sensor may be used as the eyepiece detection unit 118 so long as it is capable of detecting a state regarded as contact.

Further, the camera 100 has the display unit 107 outside the finder, a driving circuit 223 for the display unit 107 outside the finder, a power control unit 224, a power unit 225, a recording medium I/F 226, an operation unit 228, or the like.

The display unit 107 outside the finder is driven by the driving circuit 223 for the display unit 107 outside the finder and displays various setting values of a shutter speed, an aperture, or the like of the camera 100. The power control unit 224 is composed of a battery detection circuit, a DC-DC convertor, a switch circuit that switches a block to be energized, or the like and detects the presence or absence of the installation of a battery, the type of a battery, the remaining amount of a battery, or the like. Further, the power control unit 224 controls the DC-DC convertor on the basis of the result of the detection and instructions from the system control unit 50 and supplies a required voltage to respective units including the recording medium 227 for a required period. The power unit 225 is a primary battery such as an alkali battery and a lithium battery, a secondary battery such as an NiCd battery, an NiMH battery, and an Li battery, an AC adapter, or the like. The recording medium I/F 226 is an interface with the recording medium 227 such as a memory card and a hard disk. The recording medium 227 is a memory card or the like for recording a captured image and composed of a semiconductor memory, a magnetic disk, or the like. The recording medium 227 may be attachable to and detachable from the camera 100, or may be embedded in the camera 100.

The operation unit 228 is an input unit that receives an operation (user operation) from the user and used to input various instructions to the system control unit 50. The operation unit 228 includes the shutter button 101, the power switch 102, the mode selection switch 103, the touch panel 109, other operation units 229, or the like. The operation units 229 include the main electronic dial 104, the sub-electronic dial 105, the moving-image button 106, the direction key 110, the SET button 111, the AE lock button 112, the enlargement button 113, the reproduction button 114, the menu button 115, the touch bar 119, or the like.

The shutter button 101 has a first shutter switch 230 and a second shutter switch 231. The first shutter switch 230 is turned ON halfway through the operation of the shutter button 101, i.e., half-pressing (photographing preparation instructions), and outputs a first shutter switch signal SW1. The system control unit 50 starts photographing preparation processing such as AF processing, AE processing, AWB processing, and EF processing according to the first shutter switch signal SW1. The second shutter switch 231 is turned ON when the operation of the shutter button 101 is completed, i.e., full-pressing (photographing instructions), and outputs a second shutter switch signal SW2. The system control unit 50 starts a series of photographing processing from the reading of a signal from the imaging unit 211 to the writing of an image file including a photographed image into the recording medium 227 after the generation of the image file according to the second shutter switch signal SW2.

The mode selection switch 103 switches an operation mode of the system control unit 50 to any of a still-image photographing mode, a moving-image photographing mode, a reproduction mode, or the like. The still-image photographing mode includes an automatic photographing mode, an automatic scene determination mode, a manual mode, an aperture priority mode (Av mode), a shutter-speed priority mode (Tv mode), and a program AE mode (P mode). Further, the still-image photographing mode also includes a various-scenes mode for performing photographing settings for each photographing scene, a custom mode, or the like. With the mode selection switch 103, the user is enabled to directly switch the operation mode to any of the photographing modes described above. Alternatively, after temporarily switching to the list screen of the photographing modes with the mode selection switch 103, the user may select any of the plurality of the displayed modes using the operation unit 228. Similarly, the moving-image photographing mode may include a plurality of modes.

The touch panel 109 is a touch sensor that detects various touch operations on the display surface of the display unit 108 (the operation surface of the touch panel 109). The touch panel 109 and the display unit 108 may be integrally configured. For example, the touch panel 109 has transparency to such an extent that the display of the display unit 108 is not disturbed, and is attached to the upper layer of the display surface of the display unit 108. Further, input coordinates in the touch panel 109 and display coordinates on the display surface of the display unit 108 are associated with each other. Thus, a GUI (Graphical User Interface) making the user feel as if he/she were capable of directly operating a screen displayed on the display unit 108 may be configured. The touch panel 109 may be any of various types of touch panels such as a resistance-film type, a capacitance type, a surface acoustic type, an infrared type, an electro-magnetic induction type, an image recognition type, and an optical sensor type. There are a type that detects a touch operation when the touch panel 109 is touched and a type that detects a touch operation when a finger or a pen approaches the touch panel 109, but any of the types may be used.

The system control unit 50 is capable of detecting the following operations or states on the touch panel 109.

A state in which a finger or a pen that has not touched the touch panel 109 newly touches the touch panel 109, i.e., the start of a touch (hereinafter called touch-down).

A state in which the touch panel 109 is touched by a finger or a pen (hereinafter called touch-on).

A state in which a finger or a pen moves while touching the touch panel 109 (hereinafter called touch-move).

A state in which a finger or a pen that has touched the touch panel 109 is separated (released) from the touch panel 109, i.e., the end of a touch (hereinafter called touch-up).

A state in which the touch panel 109 is not touched (hereinafter called touch-off).

The touch-on is detected simultaneously when the touch-down is detected. Generally, the touch-on is continuously detected unless the touch-up is detected after the touch-down. The touch-on is continuously detected when the touch-move is detected. Even if the touch-on has been detected, the touch-move is not detected unless a touched position has been moved. After the touch-up of all touched fingers or a pen is detected, the touch-off is detected.

Via an internal bus, the system control unit 50 is notified of these operations and states or position coordinates at which a finger or a pen has touched the touch panel 109. On the basis of notified information, the system control unit 50 determines what operation (touch operation) has been performed on the touch panel 109. For the touch-move, the system control unit 50 is also enabled to determine the movement direction of a finger or a pen that moves on the touch panel 109 for each of a vertical component and a horizontal component on the touch panel 109 on the basis of the changes of position coordinates. The system control unit 50 determines that a slide operation has been performed when detecting the touch-move by at least a prescribe distance. The operation of quickly moving a finger by a certain distance while touching the touch panel 109 and then releasing the same will be called a flick. In other words, the flick is the operation of quickly tracing the touch panel 109 so as to be flipped with a finger. The system control unit 50 is enabled to determine that the flick has been performed when detecting that the touch-move has been performed by at least a predetermined distance and at least at a predetermined speed and then the touch-up has been performed in succession to the touch-move (the flick has been performed in succession to the slide operation). Moreover, the touch operation of simultaneously touching a plurality of places (for example, two points) (multi-touch) and making the touched positions get close to each other will be called pinch-in, and the touch operation of making the touched positions get away from each other will be called pinch-out. The pinch-out and the pinch-in will be generically called a pinch operation (or simply a pinch).

Figure 3:
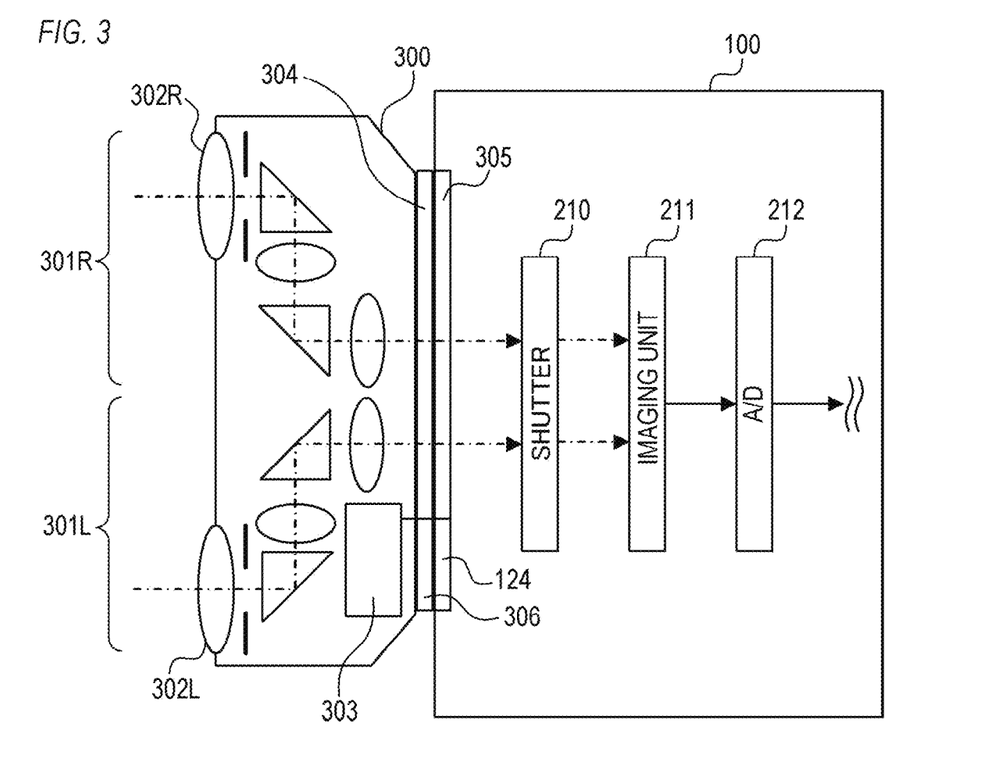
FIG. 3 is a schematic diagram showing the configuration of a lens unit.

FIG. 3 is a schematic diagram showing an example of the configuration of the lens unit 300. FIG. 3 shows a state in which the lens unit 300 is attached to the camera 100. With the lens unit 300 attached thereto, the camera 100 is enabled to capture one image (a still image or a moving image) including two image regions having predetermined parallax. Note that in the camera 100 shown in FIG. 3, the same constituting elements as those described in FIG. 2 will be denoted by the same symbols and their descriptions will be appropriately omitted.

The lens unit 300 is a type of a replaceable lens unit attachable to and detachable from the camera 100. The lens unit 300 is a dual-lens unit capable of capturing a right image and a left image having parallax. The lens unit 300 has two optical systems (photographing lenses), and each of the two optical systems is enabled to capture an image with a wide viewing angle of approximately 180 degrees. Specifically, each of the two optical systems of the lens unit 300 is enabled to capture an image of an object with a visual field (viewing angle) of 180 degrees in a right-and-left direction (a horizontal angle, an azimuthal angle, and a yaw angle) and 180 degrees (a vertical angle, an elevation angle, and a pitch angle). That is, each of the two optical systems is enabled to capture an image in a front hemispherical range.

The lens unit 300 has a right-eye optical system 301R having a plurality of lenses, a reflection mirror, or the like, a left-eye optical system 301L having a plurality of lenses, a reflection mirror, or the like, and a lens-system control circuit 303. The right-eye optical system 301R has a lens 302R arranged on an object side, and the left-eye optical system 301L has a lens 302L arranged on the object side. The lens 302R and the lens 302L are oriented in the same direction, and their optical axes are substantially parallel to each other. Each of the right-eye optical system 301R and the left-eye optical system 301L has a fish-eye lens and forms a circular optical image on the imaging unit 211. An optical image (right image) formed via the right-eye optical system 301R and an optical image (left image) formed via the left-eye optical system 301L are formed on one the imaging surface of the imaging unit 211, and the imaging unit 211 acquires one image including the image regions of the respective optical images.

The lens unit 300 is a dual-lens unit (VR180 lens unit) used to acquire an image in VR180 format that represents one of VR (Virtual Reality) image formats enabling dual-lens stereoscopic vision. The lens unit 300 has a fish-eye lens capable of capturing a range of approximately 180 degrees in each of the right-eye optical system 301R and the left-eye optical system 301L. Note that a range capable of being captured by the lens of each of the right-eye optical system 301R and the left-eye optical system 301L may be about 160 degrees narrower than 180 degrees. The lens unit 300 is enabled to form a right image formed via the right-eye optical system 301R and a left image formed via the left-eye optical system 301L on one or two imaging elements of a camera to which the lens unit 300 is attached. In the camera 100, a right image and a left image are formed on one imaging element (imaging sensor), and one image (dual-lens image) in which a right-image region corresponding to the right image and a left-image region corresponding to the left image are arranged from side to side is generated. The dual-lens image includes the right-image region, the left-image region, and a region (a non-image region, for example, a black region) not corresponding to an optical image.

The lens unit 300 is attached to the camera 100 via a lens mount unit 304 and a camera mount unit 305 of the camera 100. Thus, the system control unit 50 of the camera 100 and the lens-system control circuit 303 of the lens unit 300 are electrically connected to each other via the communication terminal 126 of the camera 100 and the communication terminal 306 of the lens unit 300.

In FIG. 3, a right image formed via the right-eye optical system 301R and a left image formed via the left-eye optical system 301L are formed from side to side on the imaging unit 211 of the camera 100. That is, two optical images are formed on the two regions of one imaging element (imaging sensor) by the right-eye optical system 301R and the left-eye optical system 301L. The imaging unit 211 converts a formed object image (light signal) into an analog electric signal. By using the lens unit 300 (the right-eye optical system 301R and the left-eye optical system 301L) in this manner, it is possible to acquire one image (dual-lens image) including two image regions having parallax. When the acquired image is divided into a left-eye image and a right-eye image to be VR-displayed, the user is enabled to view a stereoscopic VR image in the range of approximately 180 degrees. That is, the user is enabled to stereoscopically view an image in VR180 format.

In the case of a normal single-lens unit, video (optical image) incident on the lens unit is point-symmetrically inverted about the light axis of the lens unit and input to an imaging element (imaging sensor). An imaging device such as the camera 100 is enabled to generate an image without a sense of discomfort (that is, a non-inverted image) by controlling the reading order of a signal from the imaging element or by performing the inversion processing of a read signal (image). In the case of a dual-lens unit, video is vertically inverted and input to an imaging element but is not inverted horizontally. Accordingly, a left image and a right image are input to the imaging element with the left image incident via a left-eye optical system arranged on a left side and the right image incident via a right-eye optical system arranged on a right side. Therefore, when the same inversion processing as that performed in the single-lens unit is performed, the right and left sides of the camera 100 become opposite to the right and left sides of an image after the inversion processing. That is, an image in which a left-image region corresponding to a left image is arranged on the right side and a right-image region corresponding to a right image is arranged on the left side is generated.

Here, a VR image refers to an image capable of being VR-displayed that will be described later. The VR image includes an omnidirectional image (a celestial sphere image) captured by an omnidirectional camera (a celestial sphere camera), a panoramic image having a video range (an effective video range) wider than a display range capable of being displayed on a display unit at a time, or the like. Further, the VR image is not limited to a still image but also includes a moving image and a live image (an image acquired from a camera in almost real time). The VR image has a video range (an effective video range) with a visual field of 360 degrees in a right-and-left direction and a visual field of 360 degrees in a top-and-bottom direction at maximum. Further, even in a range less than 360 degrees in the right-and-left direction and less than 360 degrees in the top-and-bottom direction, the VR image also includes an image at a viewing angle wider than a viewing angle at which the capturing of an image is enabled by a normal camera or a video range wider than a display range capable of being displayed on a display unit at a time. An image captured by the camera 100 using the lens unit 300 described above is a type of the VR image. The VR display of the VR image is enabled by, for example, setting a display mode of a display device (a display device on which the VR image is displayable) to a "VR view." When the range of a part of a VR image at a viewing angle of 360 degrees is displayed and the user changes the orientation of the display device in the right-and-left direction (horizontal rotation direction), it is possible to move a display range and view an omnidirectional image seamless in the right-and-left direction.

A VR display (VR view) refers to a display method (display mode) with which it is possible to change a display range in which video within a visual-field range corresponding to the orientation of a display device is displayed as a VR image. The VR display includes "single-lens VR display (single-lens VR view)" in which a VR image is deformed (distortion correction) to be mapped on a virtual sphere to display one image. Further, the VR display includes "dual-lens VR display (dual-lens VR view)" in which a VR image for a right eye and a VR image for a left eye are deformed to be mapped on a virtual sphere and displayed side by side in a right region and a left region, respectively. By performing the "dual-lens VR display" using a VR image for a left eye and a VR image for a right eye having parallax each other, it is possible to stereoscopically view the VR images. For example, when the user wears a display device such as an HMD (Head Mounted Display), video within a visual-field range corresponding to the direction of the face of the user is displayed in both the single-lens VR display and the dual-lens VR display. For example, it is assumed that video within a visual-field range about 0 degree (in a specific direction, for example, the north) in a right-and-left direction and 90 degrees (90 degrees from the zenith, that is, a horizontal level) in a top-and-bottom direction at a certain time is displayed as a VR image. When the orientation of the display device is turned inside out (for example, when a direction in which a display surface is oriented is changed from the south to the north) from this state, a display range is changed so that video within a visual-field range about 180 degrees (in an opposite direction, for example, the south) in the right-and-left direction and 90 degrees in the top-and-bottom direction is displayed as the same VR image. That is, when the user turns his/her face from the north to the south (that is, when the user looks back) while wearing the HMD, video displayed on the HMD is also changed from video in the north to video in the south. Note that a VR image captured using the lens unit 300 is an image in VR180 format (180° image) obtained by capturing the range of approximately 180 degrees in a forward direction and does not include video within the range of approximately 180 degrees in a backward direction. When such an image in VR180 format is VR-displayed and the orientation of a display device is changed to a side on which video does not exist, a blank region is displayed.

When a VR image is VR-displayed in this manner, the user is enabled to obtain a feeling (a sense of immersion) as if he/she were visually present in the VR image (VR space). Note that a method for displaying a VR image is not limited to a method for changing the orientation of a display device. For example, a display range may be moved (scrolled) according to a user operation via a touch panel, a direction button, or the like. Further, during VR display (a display mode "VR view"), a display range may be moved according to touch-move on a touch panel, a drug operation with a mouse or the like, the pressing of a direction button, or the like in addition to the change of the display range according to the change of an orientation. Note that a smart phone attached to a VR goggle (a head mounted adapter) is a type of an HMD.

Figure 4:
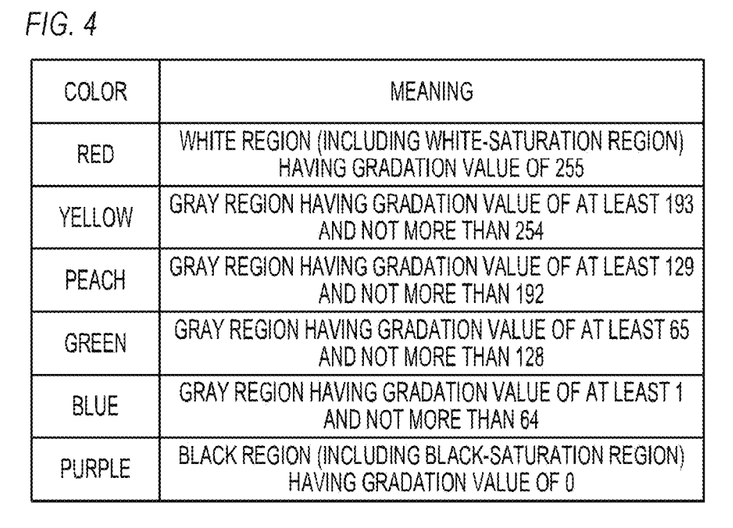
FIG. 4 is a diagram showing the meanings of respective colors (conversion colors) after false-color processing.

The image processing unit 214 is capable of performing false-color processing as color conversion processing. By the false-color processing, the colors of respective pixels of a captured image (an image captured by the imaging unit 211) are converted into colors corresponding to the brightness levels (pixel values) of the pixels. For the false-color processing, a plurality of colors corresponding to a plurality of parts within the range of the pixel values, respectively, are determined in advance. By the false-color processing, the colors of the respective pixels of the captured image are converted according to the corresponding relationship between the plurality of parts within the range of the pixel values and the plurality of colors. FIG. 4 shows an example of the meanings of respective colors (conversion colors) after the false-color processing. In the example of FIG. 4, gradation values are 8-bit values, the color of a white region (including an white-saturation region) having a gradation value of 255 is converted into red, the color of a gray region having a gradation value of at least 193 and not more than 254 is converted into yellow, and the color of a gray region having a gradation value of at least 129 and not more than 192 is converted into peach. Further, the color of a gray region having a gradation value of at least 65 and not more than 128 is converted into green, the color of a gray region having a gradation value of at least 1 and not more than 64 is converted into blue, and the color of a black region (including a black-saturation region) having a gradation value of 0 is converted into purple. Note that the example in which the achromatic colors are converted into the chromatic colors is described above. However, chromatic colors may be converted into achromatic colors, or chromatic colors may be converted into other chromatic colors.

As described above, a dual-lens image includes image regions (a right-image region and a left-image region) and a non-image region. In a captured image including image regions and a non-image region, the boundaries between the image regions and the non-image region are unclear in some cases. For example, when green portions of image regions are dark and a non-image region is black, the boundaries between the image regions and the non-image region become unclear. Further, when predetermined image processing such as false-color processing is performed on (to) a captured image including image regions and a non-image region, the predetermined image processing is performed not only on the image regions but also on the non-image region. In the present embodiment, these problems are solved, and an image (a captured image, an image after predetermined image processing, or the like) based on a captured image including image regions and a non-image region is displayed in a suitable state.

First Embodiment

Figure 5:
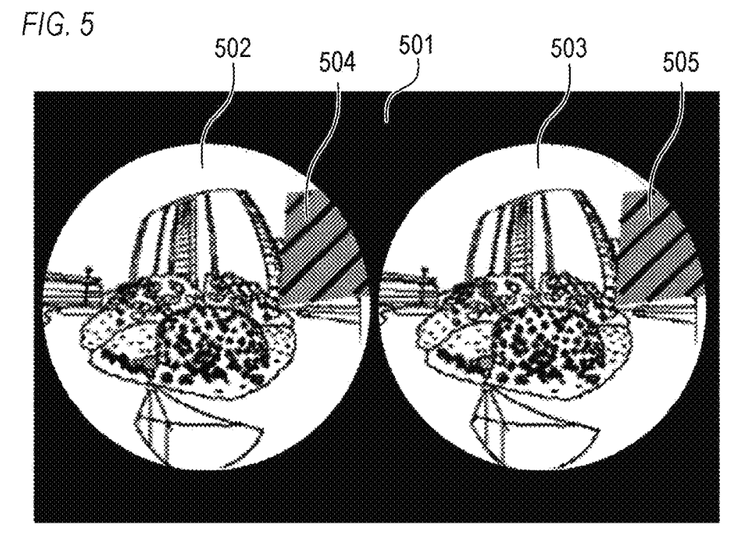
FIG. 5 is a diagram showing a display image according to a first embodiment.

In a first embodiment, an image after predetermined image processing is displayed in a state where predetermined image processing is performed on image regions and is not performed on a non-image region. For example, the image processing unit 214 does not perform predetermined image processing on a non-image region and performs the predetermined image processing on image regions. The image processing unit 214 performs false-color processing as the predetermined image processing. FIG. 5 shows an example of a display image (an image displayed on the display unit 108 or the EVF 217) according to the first embodiment. In FIG. 5, the color of a black-saturation region 504 of a right-image region 502 and the color of a black-saturation region 505 of a left-image region 503 are converted into other colors by false-color processing. On the other hand, the color of a non-image region 501 is not converted from black. In FIG. 5, image regions (the right-image region 502 and the left-image region 503) are regions inside image circles, and the non-image region 501 is a region outside the image circles.

Figure 6:
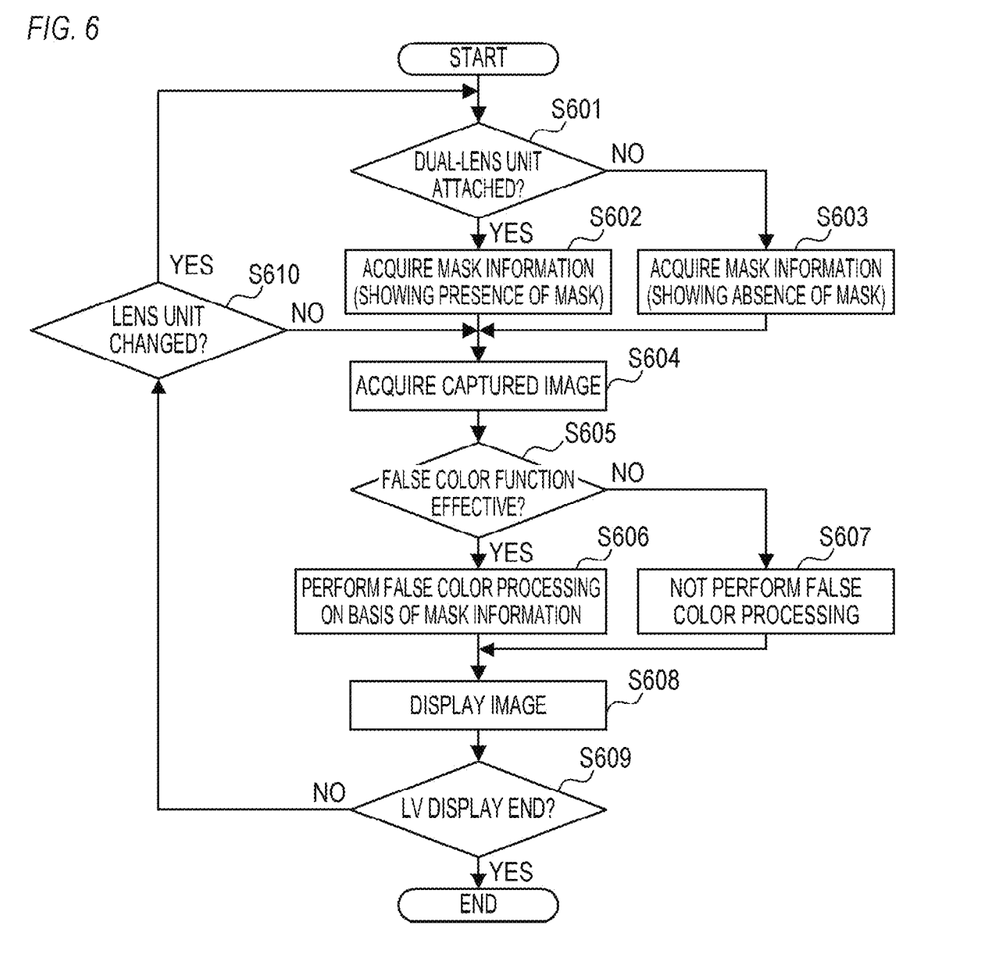
FIG. 6 is a flowchart showing LV display processing according to the first embodiment.

FIG. 6 is a flowchart showing an example of LV display processing according to the first embodiment. The LV display processing is realized when the system control unit 50 develops the program recorded on the non-volatile memory 219 into the system memory 218 and runs the developed program. The LV display processing of FIG. 6 starts, for example, when the camera 100 is activated in a photographing mode or when a mode of the camera 100 is switched to the photographing mode.

In step S601, the system control unit 50 determines whether a lens unit attached to the camera 100 is a dual-lens unit (for example, the lens unit 300). The processing proceeds to step S602 when the dual-lens unit is attached to the camera 100. Otherwise, the processing proceeds to step S603.

In step S602, the system control unit 50 acquires mask information (mask information showing the presence of a mask) corresponding to the dual-lens unit attached to the camera 100. The mask information is, for example, information showing at least one of image regions and a non-image region.

For example, a plurality of mask information corresponding to a plurality of dual-lens units is recorded in advance on the non-volatile memory 219. The system control unit 50 acquires lens information (for example, identification information such as an ID) on the dual-lens unit attached to the camera 100 from the dual-lens unit (information acquisition) and reads mask information corresponding to the acquired lens information from the non-volatile memory 219. The system control unit 50 may perform communication (for example, wireless communication) with external equipment (for example, a server on the Internet) and acquire (download) mask information corresponding to the acquired lens information from the external equipment. The lens information may include information showing the positions or diameters of image circles, and the system control unit 50 may generate mask information on the basis of the lens information. The above processing is graspable as processing to determine at least one of image regions and a non-image region on the basis of the lens information (region determination). The system control unit 50 may determine at least one of image regions and a non-image region by analyzing a captured image and generate mask information according to the result of the determination.

In step S603, the system control unit 50 acquires mask information showing the absence of a mask.

In step S604, the system control unit 50 acquires a captured image (live image) from the imaging unit 211 (image acquisition).

In step S605, the system control unit 50 determines whether a false-color function (a function to perform false-color processing) has been set effective. The processing proceeds to step S606 when the false-color processing has been set effective. Otherwise, the processing proceeds to step S607.

In step S606, the system control unit 50 determines regions where the false-color processing is to be performed (applied) using the mask information acquired in step S602 or step S603. When the mask information has been acquired in step S602, the system control unit 50 determines image regions as regions where the false-color processing is to be performed so that the false-color processing is not performed on a non-image region. When the mask information has been acquired in step S603, the system control unit 50 determines the whole captured image as a region where the false-color processing is to be performed. Then, the system control unit 50 controls the image processing unit 214 so that the false-color processing is performed on the regions determined using the mask information in the captured image acquired in step S604. Thus, an image after the false-color processing is obtained as an output image (display image).

In step S607, the system control unit 50 controls the image processing unit 214 so as not to perform the false-color processing. Thus, the captured image acquired in step S604 (the image on which the false-color processing has not been performed) is obtained as an output image (display image). Note that image processing different from the false-color processing may be performed on the output image.

In step S608, the system control unit 50 displays the output image obtained in step S606 or step S607 on the display unit 108 or the EVF 217. Note that the output image may be displayed on an external monitor.

In step S609, the system control unit 50 determines whether to end the LV display (LV display processing). The LV display processing of FIG. 6 ends when the system control unit 50 ends the LV display. Otherwise, the processing proceeds to step S610. For example, the system control unit 50 ends the LV display processing of FIG. 6 when instructions to turn off the power of the camera 100 (instructions to press the power switch 102), instructions to switch a mode of the camera 100 from a photographing mode to another mode (instructions to press the mode selection switch 103), or the like are provided.

In step S610, the system control unit 50 determines whether the lens unit attached to the camera 100 has been changed. The processing proceeds to step S604 when the lens unit has not been changed. Otherwise, the processing proceeds to step S601.

As described above, according to the first embodiment, predetermined image processing is not performed on a non-image region, and is performed on image regions. Thus, it is possible to display an image, after a predetermined image processing (for example, false color processing) to a captured image including image regions and a non-image region, in a suitable state where a boundary between an image region and non-image region is easily distinguishable.

Note that the predetermined image processing is not limited to false-color processing but may be, for example, patterning processing (processing to convert the pattern of a specific region into a predetermined pattern such as a zebra pattern), sharpening processing, various filter processing, or the like.

Further, a captured image where predetermined image processing is performed only on image regions is not limited to an image captured using a dual-lens unit but may be, for example, an image captured using another multi lens unit (triple-lens unit). A captured image where predetermined image processing is performed only on image regions may be an image captured using a monocular fish-eye lens or the like. An image where predetermined image processing is performed only on image regions is not limited to an image captured using a fish-eye lens but may be a panoramic image in letter-box format captured using a standard wide-angle lens, or the like.

Second Embodiment

In a second embodiment as well, an image after predetermined image processing is displayed in a state where the predetermined image processing is performed on image regions and is not performed on a non-image region. The first embodiment describes an example in which predetermined image processing is not performed on a non-image region and is performed on image regions. In the second embodiment, predetermined image processing is performed on the whole captured image, and an image after the predetermined image processing is displayed with a predetermined mask (a mask image or a graphic) superimposed on a non-image region.

Figure 7:
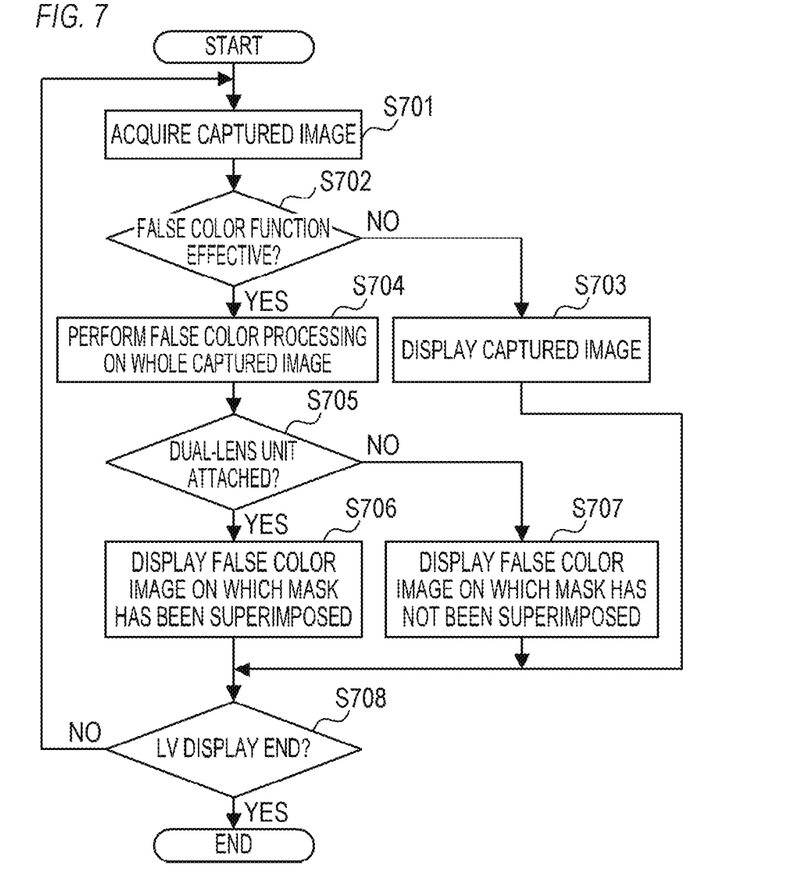
FIG. 7 is a flowchart showing LV display processing according to a second embodiment.

FIG. 7 is a flowchart showing an example of LV display processing according to the second embodiment. The LV display processing is realized when the system control unit 50 develops the program recorded on the non-volatile memory 219 into the system memory 218 and runs the developed program. The LV display processing of FIG. 7 starts, for example, when the camera 100 is activated in the photographing mode or a mode of the camera 100 is switched to the photographing mode.

In step S701, the system control unit 50 acquires a captured image (live image) from the imaging unit 211.

In step S702, the system control unit 50 determines whether the false-color function has been set effective. The processing proceeds to step S704 when the false-color function has been set effective. Otherwise, the processing proceeds to step S703.

In step S703, the system control unit 50 displays the captured image acquired in step S701 on the display unit 108 or the EVF 217.

In step S704, the system control unit 50 controls the image processing unit 214 so that false-color processing is performed on the whole captured image acquired in step S701.

In step S705, the system control unit 50 determines whether a lens unit having been attached to the camera 100 is a dual-lens unit. The processing proceeds to step S706 when the dual-lens unit has been attached to the camera 100. Otherwise, the processing proceeds to step S707.

In step S706, the system control unit 50 controls the image processing unit 214 and superimposes a mask corresponding to the dual-lens unit attached to the camera 100 on a false-color image (an image after the false-color processing in step S704). The mask is superimposed on the false-color image so as to cover a non-image region. Then, the system control unit 50 displays the false-color image on which the mask has been superimposed on the display unit 108 or the EVF 217.

In step S707, the system control unit 50 displays the false-color image on which the mask has not been superimposed on the display unit 108 or the EVF 217.

In step S708, the system control unit 50 determines whether to end the LV display (LV display processing). The LV display processing of FIG. 7 ends when the system control unit ends the LV display. Otherwise, the processing proceeds to step S701.

As described above, predetermined image processing is performed on the whole captured image, and an image after the predetermined image processing is displayed with a predetermined mask superimposed on a non-image region according to the second embodiment. Thus, it is possible to display an image, after a predetermined image processing (for example, false color processing) to a captured image including image regions and a non-image region, in a suitable state where a boundary between an image region and non-image region is easily distinguishable.

Third Embodiment

Figure 8:
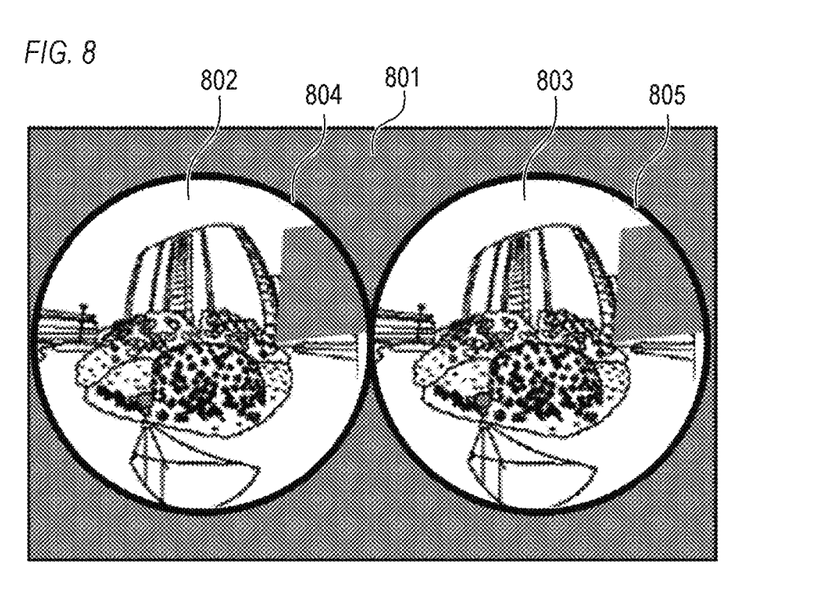
FIG. 8 is a diagram showing a display image according to a third embodiment.

In a third embodiment, an image based on a captured image (such as a captured image and an image after predetermined image processing) is displayed in a state where the boundaries between image regions and a non-image regions are emphasized (highlighted). For example, the image processing unit 214 superimposes the boundary lines (boundary images or graphics) between image regions and a non-image region on an image based on a captured image. FIG. 8 shows an example of a display image according to the third embodiment. In FIG. 8, a boundary line 804 between a right-image region 802 and a non-image region 801 and a boundary line 805 between a left-image region 803 and the non-image region 801 are drawn. In FIG. 8, the image regions (the right-image region 802 and the left-image region 803) are regions inside image circles, and the non-image region 801 is a region outside the image circles. Note that an example in which predetermined image processing such as false-color processing is not performed will be described but the predetermined image processing may be performed in the same manner as the first and second embodiments or the like.

Figure 9:
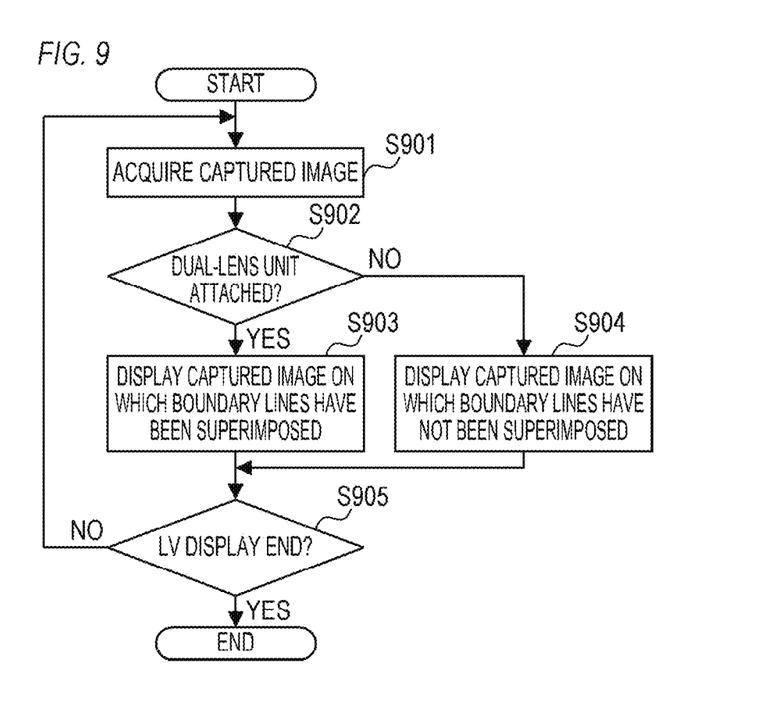
FIG. 9 is a flowchart showing LV display processing according to the third embodiment.

FIG. 9 is a flowchart showing an example of LV display processing according to the third embodiment. The LV display processing is realized when the system control unit 50 develops the program recorded on the non-volatile memory 219 into the system memory 218 and runs the developed program. The LV display processing of FIG. 9 starts, for example, when the camera 100 is activated in the photographing mode or a mode of the camera 100 is switched to the photographing mode.

In step S901, the system control unit 50 acquires a captured image (live image) from the imaging unit 211.

In step S902, the system control unit 50 determines whether a lens unit having been attached to the camera 100 is a dual-lens unit. The processing proceeds to step S903 when the dual-lens unit has been attached to the camera 100. Otherwise, the processing proceeds to step S904.

In step S903, the system control unit 50 controls the image processing unit 214 and superimposes boundary lines (boundary lines between image regions and a non-image region) corresponding to the dual-lens unit attached to the camera 100 on the captured image acquired in step S901. Then, the system control unit 50 displays the captured image on which the boundary lines have been superimposed on the display unit 108 or the EVF 217.

In step S904, the system control unit 50 displays the captured image acquired in step S901 (the captured image on which the boundary lines have not superimposed) on the display unit 108 or the EVF 217.

In step S905, the system control unit 50 determines whether to end the LV display (LV display processing). The LV display processing of FIG. 9 ends when the system control unit 50 ends the LV display. Otherwise, the processing proceeds to step S901.

As described above, the boundaries between image regions and a non-image region are emphasized according to the third embodiment. Thus, it is possible to display an image, after a predetermined image processing (for example, false color processing) to a captured image including image regions and a non-image region, in a suitable state where a boundary between an image region and non-image region is easily distinguishable.

Note that the colors, brightness, line types, or the like of boundary lines are not particularly limited so long as they are capable of making the boundaries between image regions and a non-image region conspicuous. For example, the colors or brightness of boundary lines may be changed according to the colors or brightness of image regions.

Further, a method for highlighting the boundaries between image regions and a non-image region (making the boundaries conspicuous) is not limited to a method in which boundary lines are superimposed. For example, a non-image region may be painted with a color not used inside image regions, or the pattern of a non-image region may be converted into a predetermined pattern such as a zebra pattern.

Note that the various control described above as being performed by the system control unit 50 may be performed by one hardware, or processing may be borne by a plurality of hardware (for example, a plurality of processors or circuits) to control the whole device.

Further, the embodiments of the present invention are described in detail above. However, the present invention is not limited to the specific embodiments, and various modes are also included in the present invention within the scope of the present invention. Moreover, each of the embodiments described above shows only one embodiment of the present invention, and the embodiments may be appropriately combined together.

Further, the present invention is applicable not only to cameras (imaging devices) but also to electronic equipment (display control devices) so long as they are capable of performing the display control of images. For example, the present invention is applicable to personal computers, PDAs, mobile telephone terminals, mobile image viewers, printer devices, digital photo frames, music players, game machines, electronic book readers, or the like. Further, the present invention is applicable to video players, display devices (including projection devices), tablet terminals, smart phones, AI speakers, home-electric devices, in-vehicle devices, or the like. The present invention is applicable also to multi-lens smart phones having a plurality of different types of optical systems such as a standard lens, a wide-angle lens, and a zoom lens. In this case as well, it is possible to obtain a stereoscopically-viewable image by performing photographing with the focal distances (zoom magnifications) of two used optical systems matched (made common) to each other.

Further, the present invention is applicable not only to imaging device bodies but also to control devices that communicate with imaging devices (including network cameras) via wired or wireless communication and remotely control the imaging devices. The control devices that remotely control the imaging devices include, for example, devices such as smart phones, tablet PCs, and desktop PCs. By notifying the imaging devices of a command for performing various operations or settings from the control devices on the basis of operations or processing performed by the control devices, it is possible to remotely control the imaging devices. Further, live-view images photographed by the imaging devices may be received via wired or wireless communication and displayed on the control devices.

According to the present invention, it is possible to display an image based on a captured image including image regions and a non-image region in a suitable state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-098053, filed on Jun. 17, 2022, which is hereby incorporated by reference herein in its entirety.

What is claimed is:

1. A display control device comprising:
a processor; and
a memory storing a program which, when executed by the processor, causes the display control device to
acquire a captured image including a first image region and a second image region, wherein the first image region is inside an image circle and the second image region is outside the image circle,
perform false-color processing on the captured image, and
perform control so that an image after the false-color processing is displayed in a state where the false-color processing is performed on the first image region and is not performed on the second image region,
wherein a plurality of colors corresponding to a plurality of pixel values, respectively, are determined in advance, and
wherein the false-color processing is processing to convert colors of respective pixels of the captured image according to a corresponding relationship between the plurality of pixel values and the plurality of colors.

2. The display control device according to claim 1, wherein
the false-color processing is not performed on the second image region, and the false-color processing is performed on the first image region.

3. The display control device according to claim 1, wherein
the false-color processing is performed on whole of the captured image.

4. The display control device according to claim 1, wherein
the control is performed so that the image after the false-color processing is displayed in a state where the false-color processing is not performed on the second image region by superimposing a predetermined mask on the second image region.

5. The display control device according to claim 1, wherein
the control is performed so that the image after the false-color processing is displayed with a boundary line between the first image region and the second image region superimposed thereon.

6. The display control device according to claim 1, wherein
the captured image is an image captured using a multi lens unit and the captured image includes a plurality of image circles.

7. The display control device according to claim 1, wherein
the captured image is an image captured using a multi fish-eye lens unit and
the captured image includes a plurality of image circles.

8. The display control device according to claim 1, wherein,
when the program is executed by the processor, the program further causes the display control device to determine at least one of the first image region and the second image region by analyzing the captured image.

9. The display control device according to claim 1, wherein,
when the program is executed by the processor, the program further causes the display control device to
acquire information on a lens unit used to capture the captured image, and
determine at least one of the first image region and the second image region on a basis of the information.

10. The display control device according to claim 1, wherein,
the false-color processing is performed on whole of the captured image, and
an image to be displayed is generated by superimposing the second image region in the captured image before the false-color processing on the second image region in the image after the false-color processing.

11. The display control device according to claim 1, wherein,
the false-color processing is performed on whole of the captured image,
in a case where a lens unit for capturing the captured image is a dual-lens unit, an image to be displayed is generated by superimposing the second image region in the captured image before the false-color processing on the second image region in the image after the false-color processing, and
in a case where the lens unit for capturing the captured image is a dual-lens unit, the image after the false-color processing is displayed without superimposing the second image region in the captured image before the false-color processing.

12. The display control device according to claim 1, wherein,
control is performed so that the image after the false-color processing is displayed in a state where the false-color processing is performed on the first image region and is not performed on the second image region and a boundary between the first image region and the second image region is emphasized.

13. The display control device according to claim 1, wherein,
control is performed so that the boundary to be displayed is changed according to a color or brightness of the first image region or the second image region of the image after the false-color processing.

14. The display control device according to claim 1, wherein,
control is performed so that the second image region in the image after the false-color processing is displayed in a color not used in the first image region.

15. The display control device according to claim 1, wherein, control is performed so that the second image region in the image after the false-color processing is displayed in a pattern different from a pattern of the first image region.

16. A display control method comprising:
acquiring a captured image including a first image region and a second image region, wherein the first image region is inside an image circle and the second image region is outside the image circle,
performing false-color processing on the captured image, and
performing control so that an image after the false-color processing is displayed in a state where the false-color processing is performed on the first image region and is not performed on the second image region,
wherein a plurality of colors corresponding to a plurality of pixel values, respectively, are determined in advance, and
wherein the false-color processing is processing to convert colors of respective pixels of the captured image according to a corresponding relationship between the plurality of pixel values and the plurality of colors.

17. A non-transitory computer readable medium that stores a program, wherein the program causes a computer to execute a display control method comprising:
acquiring a captured image including a first image region and a second image region, wherein the first image region is inside an image circle and the second image region is outside the image circle,
performing false-color processing on the captured image, and
performing control so that an image after the false-color processing is displayed in a state where the false-color processing is performed on the first image region and is not performed on the second image region,
wherein a plurality of colors corresponding to a plurality of pixel values, respectively, are determined in advance, and
wherein the false-color processing is processing to convert colors of respective pixels of the captured image according to a corresponding relationship between the plurality of pixel values and the plurality of colors.

* * * * *